United States Patent [19]

Savage

[11] Patent Number: 5,000,524
[45] Date of Patent: Mar. 19, 1991

[54] MOTOR-DRIVEN ANTI-LOCK BRAKE SYSTEM HAVING AUXILIARY FIELD WINDING

[75] Inventor: Jack W. Savage, Centerville, Ohio

[73] Assignee: General Motors Corporation, Detroit, Mich.

[21] Appl. No.: 518,623

[22] Filed: May 3, 1990

[51] Int. Cl.$^5$ .......................... B60T 8/32; B60T 8/58
[52] U.S. Cl. ................................. 303/115; 188/181 R; 303/100; 303/110; 303/103
[58] Field of Search ............... 303/115, 100, 110, 103, 303/102, 105, 106, 108, 112; 364/426.02, 426.01, 426.03; 318/138, 254; 188/181 R, 181 A, 181 T

[56] References Cited

U.S. PATENT DOCUMENTS

| 4,653,816 | 3/1987 | Lin | 303/106 |
|---|---|---|---|
| 4,755,945 | 7/1988 | Kade et al. | 303/96 X |
| 4,881,784 | 11/1989 | Leppek | 303/110 X |
| 4,917,445 | 4/1990 | Leppek et al. | 303/115 X |
| 4,926,099 | 5/1990 | Ricker et al. | 318/138 X |
| 4,927,212 | 5/1990 | Harrison et al. | 303/115 |
| 4,957,331 | 9/1990 | Burton et al. | 303/115 |

Primary Examiner—Douglas C. Butler
Attorney, Agent, or Firm—Mark A. Navarre

[57] ABSTRACT

An electric motor-driven brake pressure modulator has an auxiliary field winding connected in series-parallel relationship with a permanent magnet field DC motor to produce different speed/torque performance characteristics depending on the direction of motor rotation. In forward motor rotation when the brake pressure is to be increased, the mmf of the auxiliary field winding aids the mmf of the field magnets to produce a higher flux density in the working air gap of the motor. This maximizes the torque characteristic of the motor for the development of adequate brake pressure. In the reverse direction of motor rotation when the brake pressure is to be decreased, the mmf of the auxiliary field winding opposes the mmf of the field magnets to lower the flux density in the working air gap of the motor. This maximizes the speed characteristic of the motor to quickly reduce the brake pressure.

3 Claims, 4 Drawing Sheets

MOTOR-DRIVEN ANTI-LOCK BRAKE SYSTEM HAVING AUXILIARY FIELD WINDING

This invention relates to an electric motor driven brake pressure modulator for a motor vehicle anti-lock braking system, and more particularly to a modulator including a bi-directional electric motor having differential performance characteristics depending on the direction of motor rotation.

BACKGROUND OF THE INVENTION

An electric motor-driven anti-lock braking system, of the type to which this invention pertains, is generally depicted in FIG. 1. Referring to FIG. 1, the braking system comprises a hydraulic boost unit 100, a wheel brake 102, an electric motor-driven hydraulic pressure modulator 104, and an electronic controller 106 for operating the modulator 104 with current from the vehicle storage battery 108. The boost unit 100 develops hydraulic pressure in line 120 in relation to the force applied to an operator manipulated brake pedal, the line 120 being connected to the brake 102 via modulator 104 and brake line 122. Brake 102 is depicted as a disk brake caliper which develops braking force on the wheel rotor 126 in relation to the hydraulic pressure in brake line 122.

The modulator 104 comprises an actuator 130 axially displaceable in the modulator bore 132, a check ball 134 resiliently seated on a ball seat 136 disposed between the brake lines 120 and 122, and a bi-directional DC motor 138 coupled to the actuator 130 via a reduction gearset 140 and a ball screw 142 to control the axial displacement of actuator 130.

Energization of the motor 138 is controlled by the electronic controller 106 in response to a signal on line 144 indicative of the angular velocity of rotor 126. When the controller 106 energizes the motor 138 for rotation in a forward direction, the ball screw 142 extends into the bore 132, thereby extending actuator 130 to unseat the check ball 134. This opens the communication between brake lines 120 and 122, and represents the normal or quiescent state of the anti-lock brake system. When the controller 106 energizes the motor 138 for rotation in the opposite, or reverse, direction, the ball screw 142 retracts actuator 130 within the bore 132, permitting spring 146 and the fluid pressure in brake line 120 to seat the check ball 134 on the ball seat 136, thereby isolating the brake line 122 from the brake line 120. In this condition, the brake fluid in line 122 backfills the modulator bore 132, relieving the fluid pressure developed at brake 102.

In anti-lock operation, the brake pressure in line 122 is modulated by repeatedly reversing the direction of rotation of motor 138 to effect a dithering movement of the actuator 130 in the bore 132. When an incipient wheel lock condition is detected, the controller 106 causes the motor 138 to rotate in the reverse direction to retract the actuator 130; when recovery of the wheel speed is detected, the controller 106 causes the motor 138 to rotate in the forward direction to extend the actuator 130 for increasing the brake pressure.

During the anti-lock operation described above, optimum braking performance requires different motor speed/torque characteristics depending on the direction of motor rotation. When the actuator 130 is being retracted (reverse direction of rotation), the torque requirement is relatively low, but the speed requirement is relatively high in order to enable quick relief of the brake pressure. When the actuator 130 is being extended (forward direction of rotation), the speed requirement is relatively low, but the torque requirement is relatively high in order to develop adequate pressure in brake line 122. Unfortunately, the speed/torque characteristics of a conventional DC electric motor are substantially the same in both directions, and some design compromises must be made in order to provide acceptable performance in both the forward and reverse directions of motor rotation. Of course, this involves some sacrifice in the anti-lock braking performance.

SUMMARY OF THE PRESENT INVENTION

The present invention is directed to an improved electric motor-driven brake pressure modulator for an anti-lock braking system of the above type in which an auxiliary motor field winding is connected in series-parallel relationship with a conventional DC motor having permanent magnet field poles to produce different speed/torque performance characteristics depending on the direction of motor rotation.

In the forward direction of motor rotation, when the actuator 130 is extended to increase the pressure in brake line 122, the magneto-motive force (mmf) of the auxiliary field winding aids the mmf of the field magnets to produce a higher flux density in the working air gap of the motor. This maximizes the torque characteristic of the motor for the development of adequate brake pressure. In the reverse direction of motor rotation when the actuator 130 is retracted within the bore 132, the mmf of the auxiliary field winding opposes the mmf of the field magnets to lower the flux density in the working air gap of the motor. This maximizes the speed characteristic of the motor to quickly reduce the brake pressure. The result is an anti-lock braking system in which the braking performance is maximized without the design compromise penalties of presently known systems.

Alternate arrangements for achieving the above-described motor performance characteristics are disclosed and claimed in the following co-pending U.S. patent applications, also assigned to the assignee of the present invention.

- U.S. Ser. No. 334,417; filed Apr. 7, 1989; allowed Dec. 5, 1989 now U.S. Pat. No. 4,926,099; Bimodal Controller for a Multi-Phase Brushless DC Motor
- U.S. Ser. No. 392,162; filed Aug. 10, 1989; Motor-Driven Anti-Lock Brake Pressure Modulator having Differential Motor Performance Characteristics
- U.S. Ser. No. 410,781; filed Sep. 22, 1989; Bi-Modal DC Motor Control for a Motor-Driven Anti-Lock Brake System

DETAILED DESCRIPTION OF THE DRAWINGS

Figure 2:
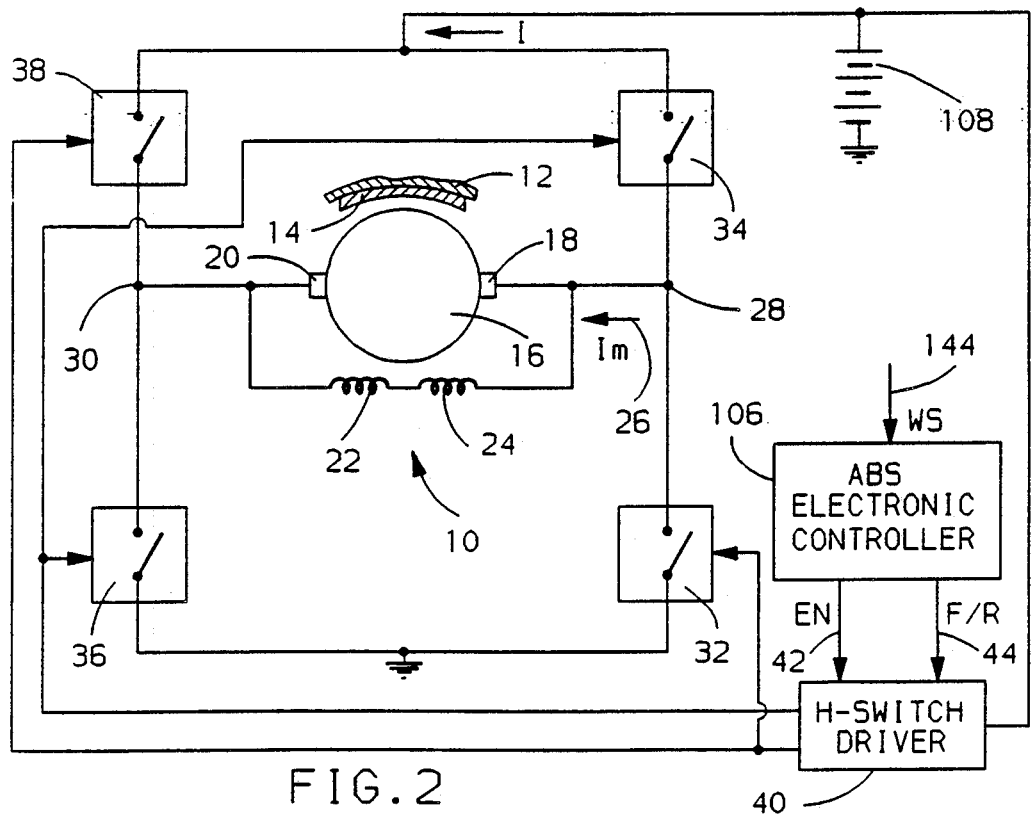
FIG. 2 is a schematic diagram of a motor drive arrangement including a permanent magnet DC motor having an auxiliary field winding according to the present invention.

Referring to FIG. 2, the reference numeral 10 generally designates a schematic representation of a permanent magnet field DC motor according to this invention. As with any permanent magnet field DC motor, the stator 12 includes two or more permanent magnets 14 defining the motor field poles and a wound rotor 16 defining corresponding rotor poles (not shown). The brushes 18 and 20 ride on a conventional commutator (not shown) comprising a plurality of rotary conductor segments affixed to the rotor 16. The conductor segments, in turn, are connected to distributed turns of the rotor winding (not shown) to ensure that the rotor poles are magnetized in relation to the rotor position to produce torque for turning the rotor in the desired direction.

Figure 5A:
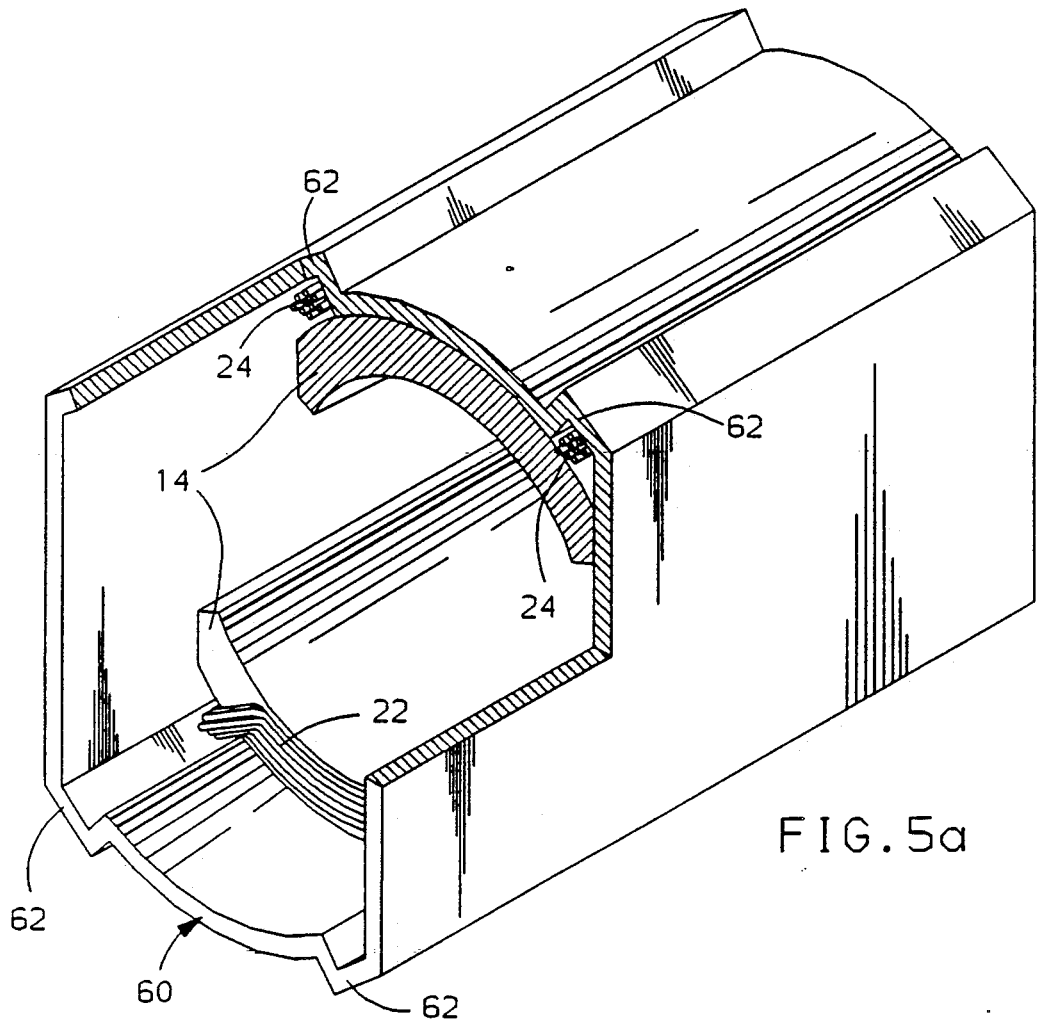
FIGS. 5a, 5b and 5c depict first, second and third design embodiments of the motor depicted in FIG. 2.
Figure 5B:
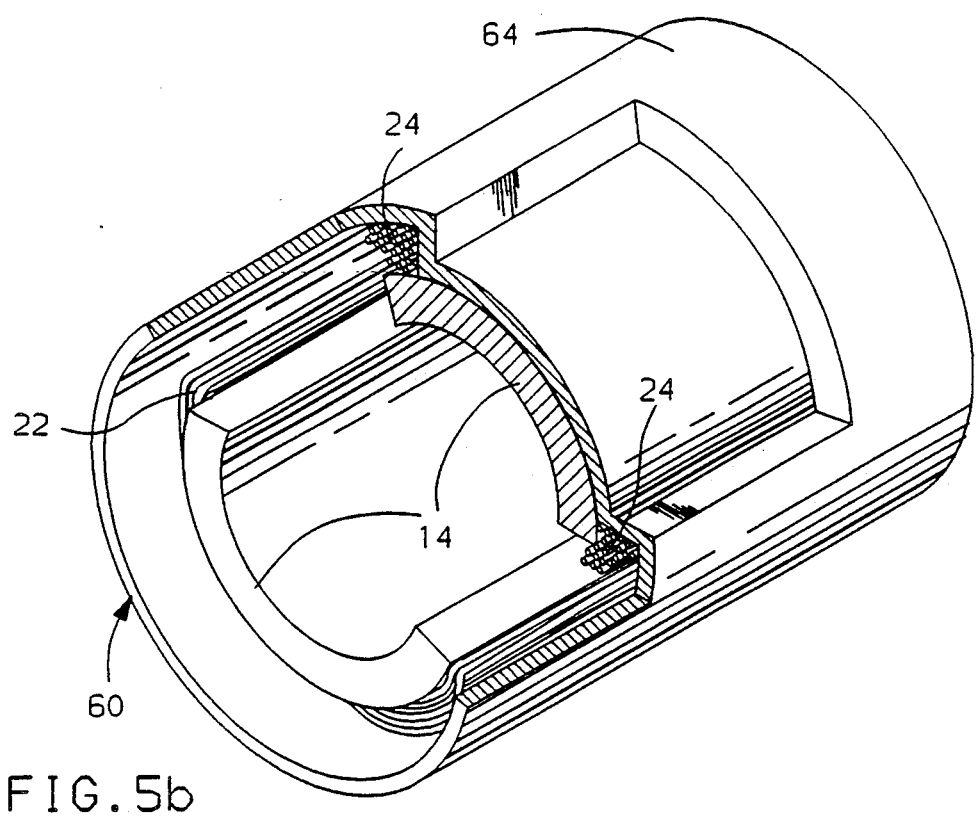
Figure 5C:
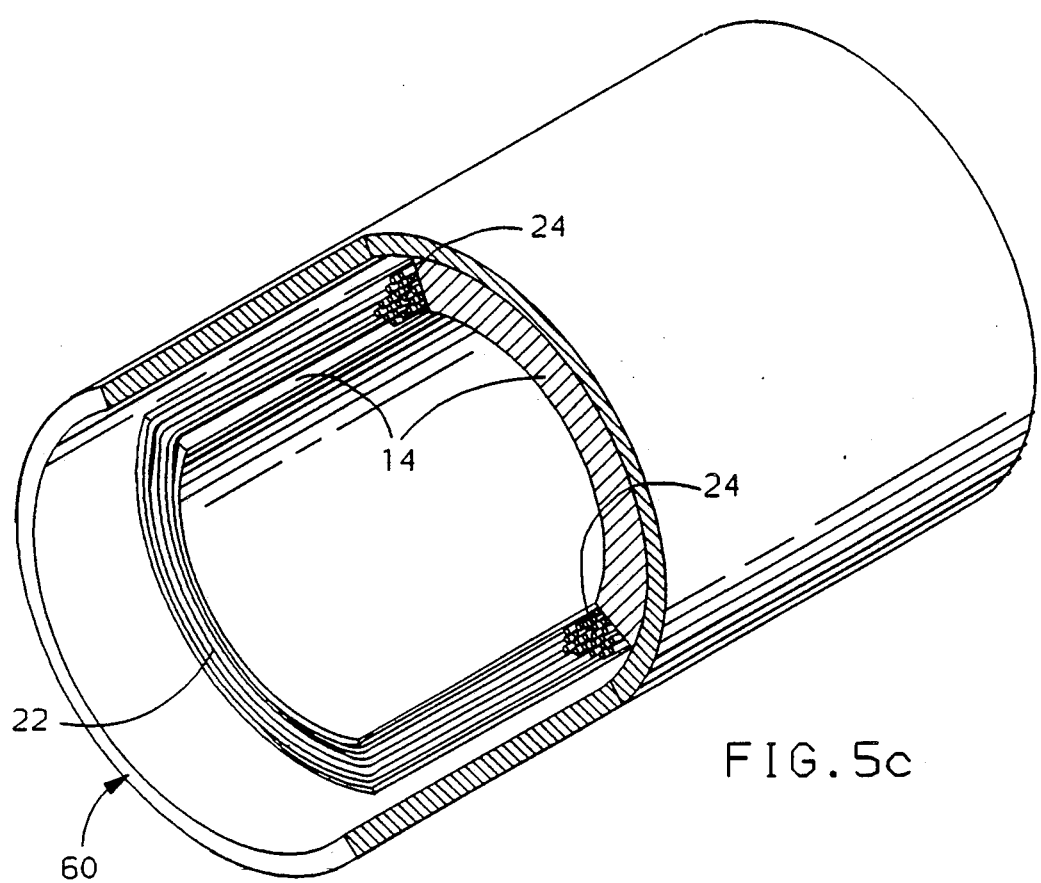

An auxiliary field winding comprising two or more series-connected coils 22 and 24 is connected across the commutator brushes 18 and 20, electrically in parallel with the windings of rotor 16. In the illustrated embodiment, the stator has two permanent magnets 14, and the coils 22 and 24 are individually wound around the respective permanent magnets 14, as shown in FIGS. 5a–5c. In a motor having four permanent magnet field poles, for example, the auxiliary winding would comprise four series-connected coils.

In operation, the coils 22 and 24 produce a magnetomotive force, or mmf, which either adds to or subtracts from the mmf produced by the permanent magnets 14. This, in turn, either increases or decreases the magnetic flux density in the working air gap between the stator 12 and rotor 16. Significantly, the mmf produced by the permanent magnets 14 is unidirectional, while the mmf produced by the coils 22 and 24 is bi-directional depending on the direction of motor current.

When the motor current Im is in the direction of arrow 26 — that is, from terminal 28 to terminal 30, the rotor windings are energized via brushes 18 and 20 for producing a first (forward) direction of motor rotation for increasing the brake pressure. The sense or polarity of the coils 22 and 24 is such that during this condition, their mmf aids the mmf of the permanent magnets 14. As a result, the air gap flux density is increased, and the motor torque is maximized.

When the motor current Im is in a direction opposite to arrow 26 — that is, from terminal 30 to terminal 28, the rotor windings are energized via brushes 18 and 20 for producing a second (reverse) direction of motor rotation for releasing the brake pressure. In this case, the coils 22 and 24 produce mmf of the opposite polarity which opposes the mmf of the permanent magnets 14. As a result, the air gap flux density is decreased, and the motor speed is maximized to relatively quickly retract the actuator 130 within the valve bore 132 to relieve the brake pressure.

Figure 1:
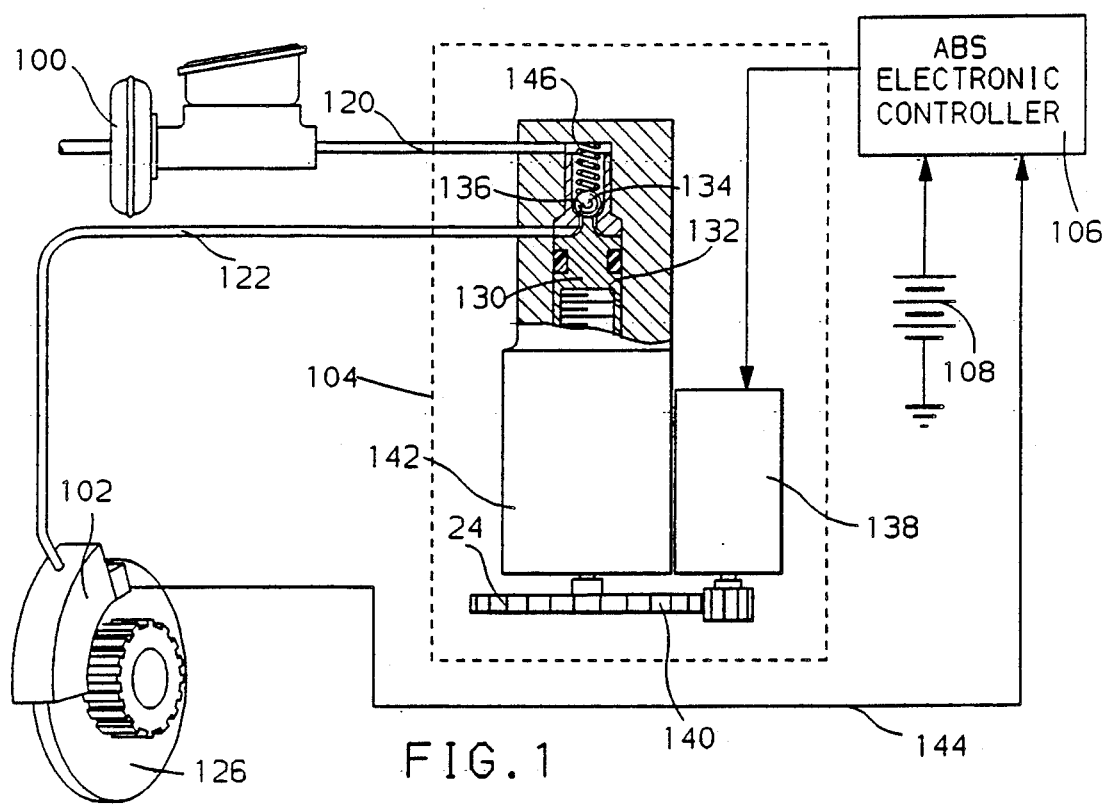
FIG. 1 is a system drawing of a vehicular anti-lock braking system of the type to which the present invention pertains.

The motor current is supplied from a vehicle storage battery 108 via a bridge or H-switch comprising the electronic switches 32, 34, 36 and 38. The switches 32–38, which may be transistors, relays or other switching devices, are operated by a conventional H-switch driver circuit 40, which in turn, is controlled by the ABS electronic controller 106. The enable (EN) and forward/reverse (F/R) inputs on lines 42 and 44 are generated by the controller 106 in response to vehicle wheel speed information (WS) as described above in reference to FIG. 1.

The bridge switches 32 and 34 selectively connect the motor terminal 28 to the negative (ground) and positive terminals of battery 108, respectively. The bridge switches 36 and 38 selectively connect the motor terminal 30 to the negative (ground) and positive terminals of battery 108, respectively. When it is desired to increase the brake pressure, the ABS electronic controller 106 signals the H-switch driver 40 to close the bridge switches 34 and 36 to produce motor current Im in the direction of arrow 26. When it is desired to decrease the brake pressure, the ABS electronic controller 106 signals the H-switch driver 40 to close the bridge switches 32 and 38 to produce motor current Im in the opposite direction.

Figure 3:
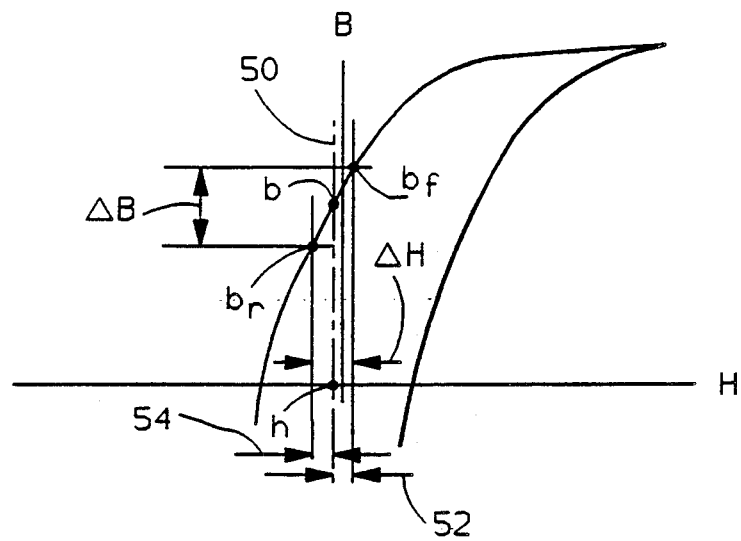
FIG. 3 depicts a magnetization curve for the motor of FIG. 2, illustrating the differential performance characteristics achieved.
Figure 4A:
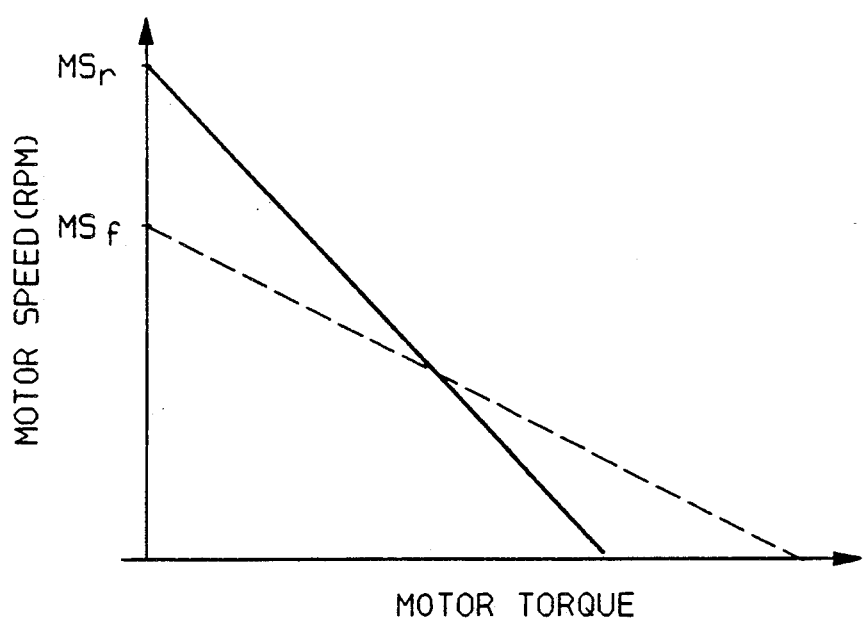
FIGS. 4a and 4b depict the motor speed vs. motor torque and battery current vs. motor torque characteristics, respectively, for the forward and reverse directions of motor rotation.
Figure 4B:
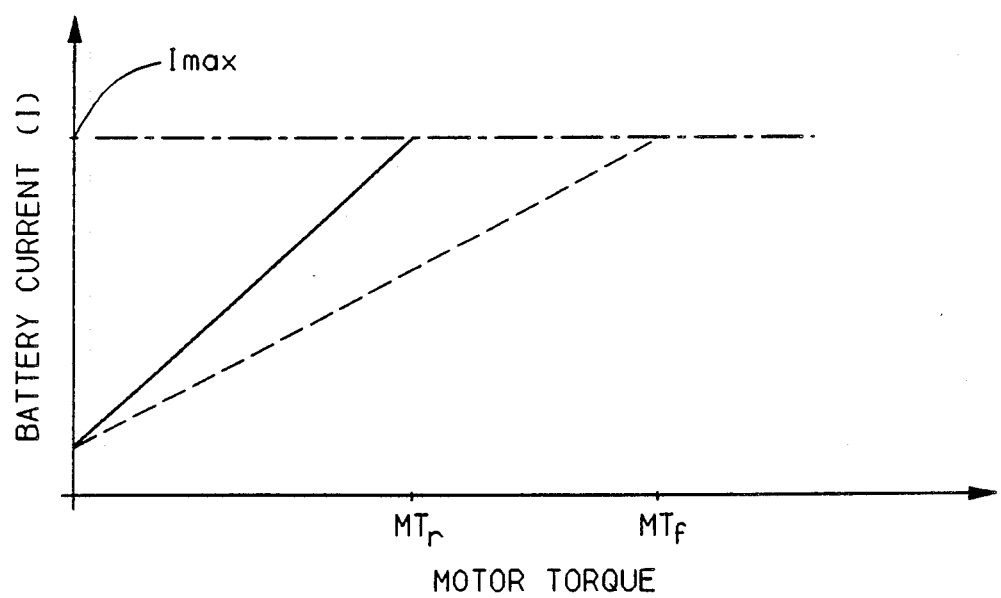

FIGS. 3, 4a and 4b graphically illustrate the effect of the auxiliary coils 22 and 24 on the performance characteristics of motor 10. FIG. 3 depicts the first and second quadrants of a magnetization curve for motor 10. The magnetization curve represents the magnetic flux density B achieved in the stator 12 for a given magnetic field intensity H. The permanent magnets 14 produce a particular magnetic field intensity h represented by the broken vertical line 50, resulting in a normal operating flux density b. If the motor 10 is energized for forward operation, the coils 22 and 24 produce mmf which aids the permanent magnet field intensity in the amount designated by arrow 52, resulting in a forward flux density of $b_f$ which is greater than the normal flux density b. If the motor 10 is energized for reverse operation, the coils 22 and 24 produce mmf which opposes the permanent magnet field intensity in the amount designated by arrow 54, resulting in a reverse flux density of $b_r$ which is less than the normal flux density b. The differential magnetic intensity and the corresponding differential flux density produced by the coils 22 and 24 is indicated by the DELTA-H and DELTA-B, respectively.

FIGS. 4a and 4b depict the motor speed and current, respectively, as a function of motor output torque. In each case, the forward direction characteristic is designated by the broken trace, and the reverse direction characteristic is designated by the solid trace.

Referring to FIG. 4a, it will be seen that the free speed of the motor in the reverse direction $MS_r$ is significantly greater than in the forward direction, $MS_f$. This occurs because the induced emf, which otherwise remains substantially constant, is proportional to the product of the air gap flux density and the motor speed. In forward operation when the flux density is increased by the coils 22 and 24, the free speed is lower. In reverse operation when the flux density is decreased by the coils 22 and 24, the free speed is higher. In practice, the speed advantage during reverse operation may be on the order of 1.5:1.

Referring to FIG. 4b, it will be seen that the stall torque at the current limit Imax in the forward direction, $MT_f$, is substantially greater than in the reverse direction, $MT_r$. This occurs because the stall torque is proportional to the product of the air gap flux density and the rotor current. In forward operation when the flux density is increased by the coils 22 and 24, the torque is higher. In reverse operation when the flux density is decreased by the coils 22 and 24, the torque is lower. In practice, the torque advantage during forward operation may be on the order of 1.5:1.

FIGS. 5a-5c depict three different embodiments of the stator 12. In each case, the permanent magnets 14 are glued or otherwise secured in a motor case 60, which is equivalent to the stator 12 of FIG. 2, and the coils 22 and 24 are wound around respective magnets 14. In the embodiment of FIG. 5a, the sides of the coils 22 and 24 are disposed radially outboard (behind) of the magnets 14 in axially extending open channels 62 of case 60, and the end turns are disposed in the plane of the magnets 14 at either end thereof. In the embodiment of FIG. 5b, the coils 22 and 24 lie entirely behind the magnets 14 in a pair of closed case channels 64. In the embodiment of FIG. 5c, the case 60 is cylindrical, and the coils 22 and 24 are simply wound around the periphery of the magnets 14.

While the present invention has been described in reference to the illustrated embodiments, it will be recognized that various modifications will occur to those skilled in the art. For example, similar advantages may be achieved by using a single auxiliary coil instead of two serially connected coils as shown in the illustrated embodiment. In this case, the single coil would comprise the sum of the turns of the individual coils so that the total ampere-turn product of the auxiliary winding would remain the same. In this regard, it will be understood that systems incorporating such modifications may fall within the scope of this invention which is defined by the appended claims.

The embodiments of the invention in which an exclusive property or privilege is claimed are defined as follows:

1. A vehicle brake pressure modulator including an actuator displaceable to develop a regulated fluid brake pressure, and pressure control means including an electric motor drivingly connected to said actuator and adapted to be driven in forward and reverse directions to effect forward and reverse displacement of said actuator for increasing and decreasing said brake pressure, the improvement wherein:
the electric motor includes a wound rotor and a stator having permanent magnet field poles; and
an auxiliary winding is wound around at least one of said permanent magnet field poles and connected electrically in parallel with said wound rotor so that (1) when the rotor is supplied with current of a polarity to produce forward displacement of said actuator, the auxiliary winding produces mmf which magnetically aids the permanent magnet field poles to thereby increase the stall torque of the motor for adequately developing the increase in brake pressure and (2) when the rotor is supplied with current of a polarity to produce reverse displacement of said actuator, the auxiliary winding produces mmf which magnetically opposes the permanent magnet field poles to thereby increase the free speed of the motor for quickly effecting the decrease in brake pressure.

2. The improvement set forth in claim 1, wherein the stator comprises a case in which the permanent magnet field poles are disposed, the case includes channels formed about the periphery of said permanent magnet field poles, and the auxiliary winding coils are disposed in said channels.

3. A vehicle brake pressure modulator including an actuator displaceable to develop a regulated fluid brake pressure, and pressure control means including an electric motor drivingly connected to said actuator and adapted to be driven in forward and reverse directions to effect forward and reverse displacement of said actuator for increasing and decreasing said brake pressure, the improvement wherein:
the electric motor includes a wound rotor and a stator having two or more permanent magnet field poles; and
an auxiliary winding is connected electrically in parallel with said wound rotor, the auxiliary winding comprising two or more serially connected coils individually wound around respective ones of said permanent magnet field poles so that (1) when the rotor is supplied with current of a polarity to produce forward displacement of said actuator, the auxiliary winding produces mmf which magnetically aids the permanent magnet field poles to thereby increase the stall torque of the motor for adequately developing the increase in brake pressure and (2) when the rotor is supplied with current of a polarity to produce reverse displacement of said actuator, the auxiliary winding produces mmf which magnetically opposes the permanent magnet field poles to thereby increase the free speed of the motor for quickly effecting the decrease in brake pressure.

* * * * *